United States Patent [19]
Malinao

[11] Patent Number: 5,154,381
[45] Date of Patent: Oct. 13, 1992

[54] MICROPHONE BOOM HOLDER

[76] Inventor: Michael M. Malinao, 440 I.O.O.F. Ave., Gilroy, Calif. 95020

[21] Appl. No.: 279,418

[22] Filed: Dec. 2, 1988

[51] Int. Cl.⁵ .............................................. F16L 3/00
[52] U.S. Cl. .................................. 248/178; 248/121; 403/354; 403/299
[58] Field of Search ............... 248/178, 177, 188, 187, 248/188.1, 231.9, 314, 121, 291; 403/354, 360, 375, 299

[56] References Cited

U.S. PATENT DOCUMENTS

| | | | |
|---|---|---|---|
| 2,271,194 | 1/1942 | Ingwer et al. | 248/122 |
| 2,476,239 | 7/1949 | Duncan | 248/122 |
| 2,776,462 | 1/1957 | Burroughs | 248/187 |
| 3,324,254 | 6/1967 | Shaw et al. | 248/121 X |
| 4,760,984 | 8/1988 | Hennessey | 248/121 |

OTHER PUBLICATIONS

"The Last Stand", Ultimate Support Systems, company brochure copyright 1986 4 pages (color).

"A Home for The Homeless Studio", Ultimate Support Systems company brochure, 8 pages (black & white).

*Primary Examiner*—Karen J. Chotkowski
*Attorney, Agent, or Firm*—Jacques M. Dulin; Elizabeth Enayati

[57] ABSTRACT

Microphone boom holder assembly comprising a short, solid base rod or tube member adapted to be receivingly engaged in a tubular supporting leg of a music stand or an A-frame recording assembly, a top shoulder, a securing member, preferably a rollpin or knurled nut, and a threaded upper rod. The base member is preferably made of a solid piece of aluminum with a plurality of grooves extending externally along its length. The base member is inserted into a tubular supporting leg of an A-frame music recording assembly to the point at which it is stopped by the shoulder. The aluminum provides sufficient strength to prevent the boom holder of this invention from breaking under the weight of the microphone boom or other holder unit under vibrationally stressed use conditions.

5 Claims, 2 Drawing Sheets

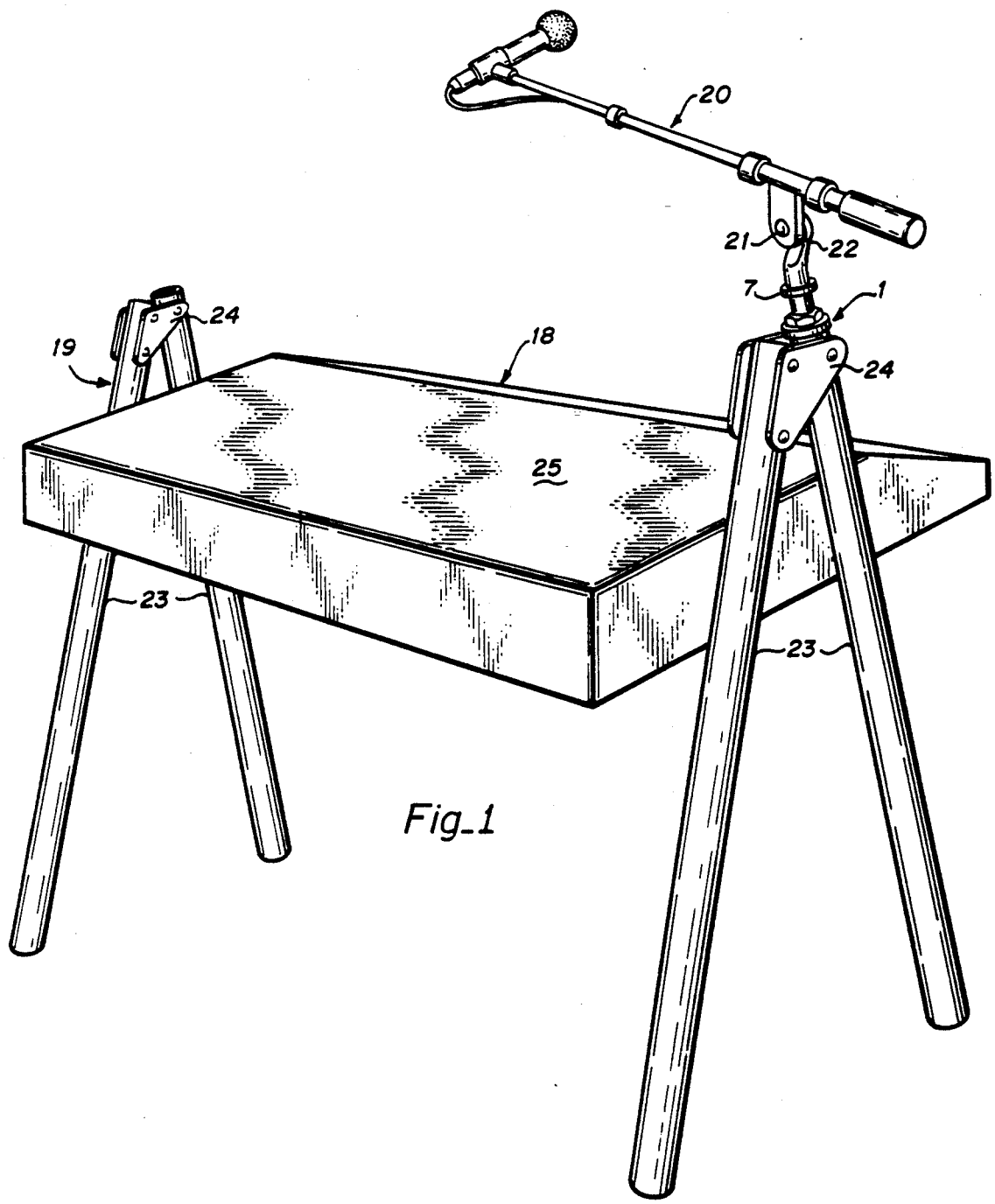
Fig_1

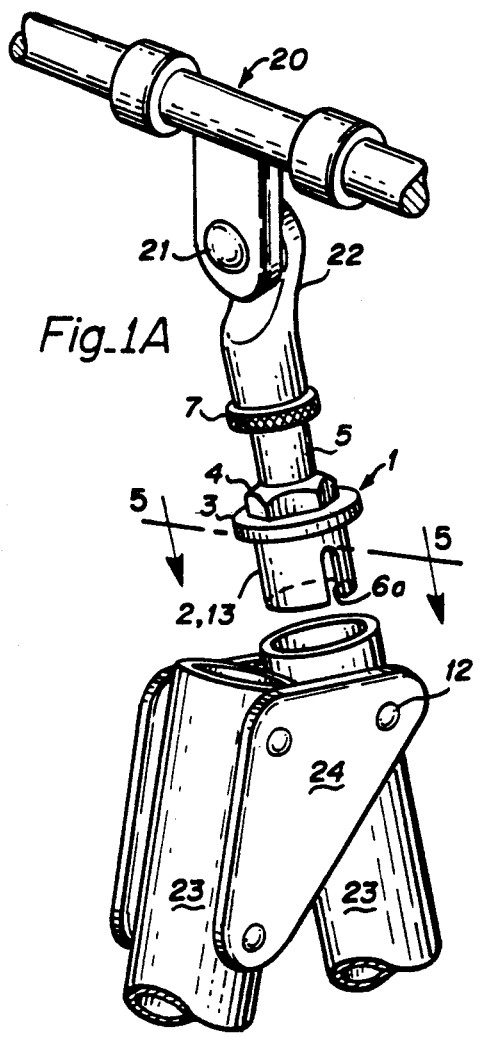
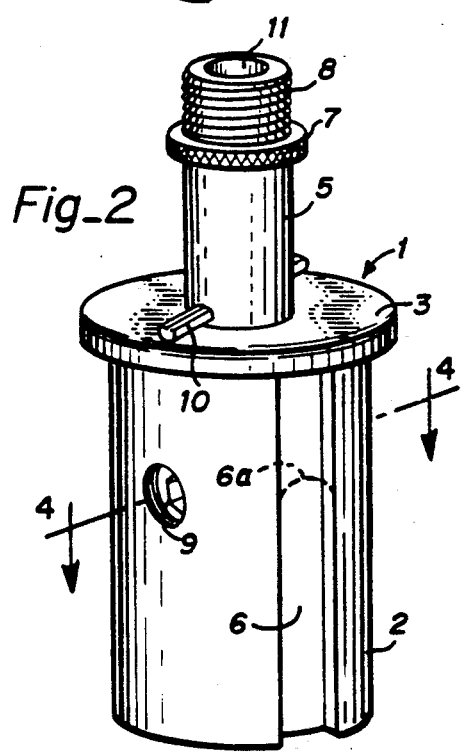
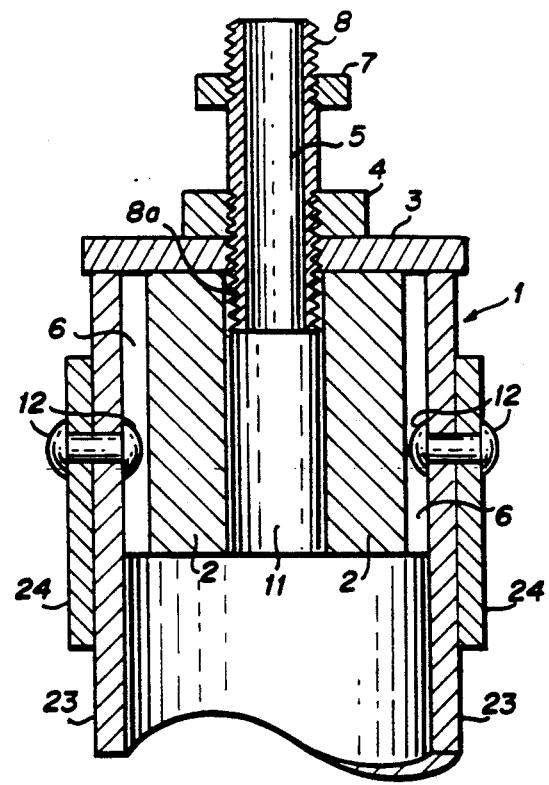
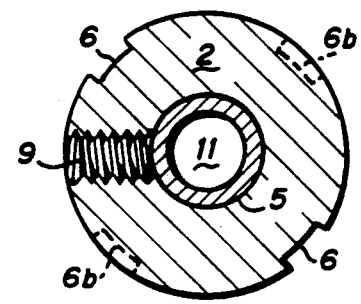
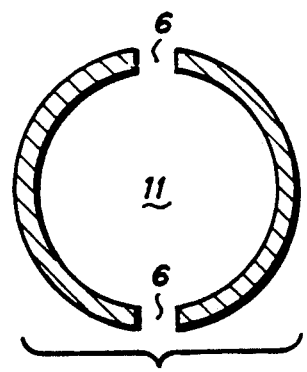

MICROPHONE BOOM HOLDER

FIELD

This invention relates to improved microphone boom holders for use in conjunction with music stands. Specifically, the microphone boom holder is designed to be inserted in the hollow supporting tube of an A-frame music recording assembly for use in securely attaching a microphone boom, or other holder unit.

BACKGROUND

The increasing sophistication of music recording devices has made home recording prevalent among musicians. Complex and technologically advanced equipment has become more affordable and thus, more accessible to professional and non-professional musicians. However, a musical recording can only be as good as the recording environment permits. This environment includes the placement and stability of the equipment, as well as the comfort of the surroundings.

A microphone is the key element in a recording environment. It is critical that it be positioned in front of the performer's mouth or instrument to optimize the microphone's available frequency range. In the environment of use of a microphone, there is often substantial physical activity of the performer. The vibrations from such movements, or of the sounds themselves, may cause a microphone boom to move, oscillate, or drift away from its focal point. This is a problem since the resulting sound reproduction will be non-uniform, possibly producing a distorted sound.

Many microphones used by musicians have a predetermined optimal range, such that sound directed to the top of the microphone head will have a different tonality than sound picked up from the sides of the microphone head. Such microphones are typically used for recording vocal music wherein a change in distance, angle or direction of the microphone relative to the mouth of the performer results in distortion and variable sound dynamics.

Microphones, particularly those used in a music recording environment, are typically held in place by long tubes, or booms, which permit the microphone to extend over equipment, such as keyboards or synthesizers. Currently available boom holders are clamps or T-adapters which attach a boom to track units which holds other recording components. The clamps are usually plastic or some other lightweight material which often break under the weight and the stress of vibrations sent out by the music being recorded. The clamps often transmit vibration, resulting in a drifting microphone or feedback.

There is thus a great need for a microphone boom holder which secures a microphone boom to its stand or track unit without breaking or allowing the microphone to drift away from the user.

THE INVENTION

It is among the objects of the invention to provide an improved microphone boom holder having a base member made of a strong material which will not break or allow the microphone boom to drift when fitted into a supporting tube used in an A-frame music recording assembly.

It is among the objects of the invention to provide an improved microphone boom holder adapted to permit its insertion into supporting tubes having rivets or other fasteners extending to the internal surface.

Still further and other objects of the invention will be evident from the Summary, Drawings, and Detailed Description of the Best Mode of the invention.

SUMMARY

Quality recording of music requires the use of a stable, fixed microphone. These microphones are often placed on a boom, which extends the reach of the microphone, allowing it to be used in conjunction with a keyboard, synthesizer, mixing panel or other musical device. Currently available booms are attached to the boom stand by means of a clamp or T-shaped adapter, usually constructed of a light-weight material which easily breaks.

The microphone boom holder assembly of this invention is especially well-suited for the professional performing keyboardist or musician in a nightclub, wedding or casual engagement. The invention is portable, convenient to carry and creates a well-organized appearance to the equipment used on stage. Use of the invention saves in set-up and tear-down time and eliminates the need for transporting a bulky microphone stand.

The present invention is a microphone boom holder, comprising a short, solid base rod or tube member adapted to be receivingly engaged in a tubular supporting leg of a music stand or an A-frame recording assembly, a top shoulder, a securing member, preferably a roll-pin or knurled nut, and a threaded upper rod. The base member is preferably made of a solid piece of aluminum with a plurality of grooves extending externally along its length. The base member is inserted into a tubular supporting leg of an A-frame music recording assembly to the point at which it is stopped by the shoulder. The aluminum provides sufficient strength to prevent the boom holder of this invention from breaking under the weight of the microphone boom under use conditions.

A top shoulder, preferably comprising a washer of a solid metal material, is positioned at the top of the base rod and has a diameter larger than the diameter of the base rod. The washer acts as a stopper, to prevent the holder unit from sliding down the full length of the A-frame tube. A roll pin or nut is positioned above the washer to hold the washer in place and to prevent rattling or movement which may occur from the vibration of music being recorded.

One end of the upper rod is inserted into the center of the base rod, preferably attached by means of the threaded portions of the upper and base rods. A microphone boom or other holder unit, is attached at the other end of the threaded tube. A top nut is positioned under the boom along a top threaded portion of the upper rod to secure the boom to the holder unit of this invention.

The strong base member material and the utilization of nuts and roll pins makes this improved microphone boom holder able to support great weight without breaking. The grooves in the base member engage rivets or other pivot members on the interior of the A-frame stand leg preventing the holder from rotating. This in turn prevents the microphone from drifting away from the focal point of the user under use (vibrations and weight of the boom), especially in an A-frame music recording assembly arrangement.

The microphone boom holder assembly of this invention is particularly good for the guitarist or musician who also plays keyboards. The A-frame stand into which the holder may be inserted can be positioned on either side of the musician, thus the performer would not be blocked by the microphone boom stand while performing. For example, if the performer wants to play keyboards alternately with playing the guitar while singing, the A-frame stand may be positioned to the side of the performer, and the microphone can be positioned accordingly while being securely held into place by the microphone boom holder assembly.

BRIEF DESCRIPTION OF DRAWINGS

The invention is illustrated in the following drawings:

FIG. 1 is a perspective view of the microphone boom holder of the invention in use in an A-frame music recording assembly;

FIG. 1A is an enlarged perspective view of the microphone boom holder of the invention, showing its insertion into an A-frame supporting tube;

FIG. 2 is a perspective view of the preferred embodiment of this invention in which a roll pin is used to secure the underlying shoulder washer member;

FIG. 3 is a cross-section view of the boom holder of this invention in its operative form in an A-frame music recording assembly, depicting the use of a nut to secure the underlying washer;

FIG. 4 is a transverse section of this invention taken along line 4—4 of FIG. 2 in which an allen head screw is used to secure the upper threaded rod; and FIG. 5 is a transverse section of this invention taken along line 5—5 of FIG. 1A depicting an alternate embodiment in which the base rod comprises a tube.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

FIG. 1 is a perspective view of the microphone boom holder of the invention in use in an A-frame music recording assembly 18 The microphone boom holder assembly 1 is inserted, as shown in FIG. 1A, into one of two A-frame supporting legs 23, which comprise the A-frame music recording assembly 18. The tubular A-frame legs 23 are pivotally attached by an A-frame hinge bracket 24 near or at the point of insertion of the microphone boom holder assembly Suspended between two A-frame tube/bracket assemblies 19 is a music or recording component 25.

FIG. 1A is an enlarged perspective view of the microphone boom holder assembly 1, showing its insertion into an A-frame supporting tubular leg 23. A tubular base member 13 is shown having a pair of rivet grooves 6a partially extending along opposed sides to permit it to receivingly engage the pivot rivet 12 of the A-frame hinge bracket 24. The pivot rivet 12 thus engaged in a rivet groove 6a prevents the microphone boom holder assembly 1 from rotating around inside the tubular support leg 23 A shoulder, formed by a base washer 3, is placed on or attached to the tubular base member 13, acts as a stop to prevent the entire microphone boom holder assembly from sliding irretrievably down into the A-frame supporting tube 23.

The shoulder may be formed as part of the solid base member (2, of FIG. 2) or may be a separate element. If a separate component, it may be a round washer 3, or any geometric shape such as a square, rectangle or hexagon. All geometric shapes would function well so long as they form a shoulder extending beyond the diameter of the underlying base member 2.

A shoulder may not be necessary when partially extending rivet grooves 6a are used. These partially extending rivet grooves 6a allow the solid base rod 2 to slide into a tubular A-frame supporting leg 23 until the rivet 12 engages the top rounded portion of the partially extending rivet groove 6a.

A positioning nut 4 is placed above the washer 3 to secure the washer and to prevent it from rattling or moving. The positioning nut 4 is screwed onto a threaded portion of the upper rod 5.

As shown in FIG. 2, a roll pin 10 may be used to secure the washer 3 in place of a nut 4. The roll pin 10 is made of a piece of metal curled to form a tube, and is passed through the diameter of the upper rod 5 just above the washer 3.

A top nut 7 is used to secure a microphone boom base member 22 which is screwed onto the top threaded portion 8 of the upper rod 5 (See FIGS. 2 and 3). The upper rod 5 extends from the microphone boom base member 22 partially through the boom holder base member 2. The base member 2 may be made of solid aluminum for strength. In the alternate, the base member 2 may be any geometric shape, such as square, rectangular or hexagonal, depending upon the type of supporting tube into which it will be inserted.

As best shown in FIG. 2 the upper rod 5 is a substantially straight smooth rod with the exception of the top threaded portion 8 and optional bottom threaded portion (8a of FIG. 3). This upper rod 5 may be screwed into the base rod 2 as shown in FIG. 3, or integrally attached to the shoulder washer 3 which is then attached to the base member 2. The upper rod 5 may be held in place in the base member 2 by means of an optional allen head screw 9. FIG. 2 also depicts an alternate embodiment of the rivet grooves 6, showing the groove extending the entire length of the base member 2. The grooves may be terminated as at 6a to form partially extending rivet grooves to act as a vertical stop for the microphone boom holder assembly 1 in place of using a shoulder or washer 3. In addition, the base member 2 may have smooth sides, with no grooves of diameter small enough to clear the rivet heads 12.

FIG. 3 is a cross-section view of microphone boom holder assembly I fully inserted into a tubular A-frame supporting leg 23. The positioning of the rivets 12 in relation to the location of the groove 6 is clearly shown in FIG. 3. The shoulder member 3 rests on the upper end of the A-frame supporting leg 23, thus preventing the microphone boom holder assembly 1 from irretrievably sliding down the supporting tube. Nut 4 secures the shoulder member 3 to keep it securely in place, and to prevent it from rattling and making other interfering noises. The embodiment depicted in FIG. 3 shows the upper rod 5 having a bottom threaded portion 8a which mates with a corresponding threaded portion of the central aperture 11 of the base member 2. In an alternate embodiment the upper rod 5 is inserted, not screwed, into the base member 2, and is then secured by the allen head screw 9 (See FIGS. 1A, 2 and 4).

FIG. 4 is a transverse section of this invention taken along line 4—4 of FIG. 2 showing in cross-section the allen head screw 9 securing the upper rod 5 in position within the base member 2. FIG. 4 also shows the central aperture 11 which extends the entire length of the microphone boom holder assembly This central aperture II may be used for passing wires through the A-frame supporting tube (23 of FIGS. 1 and 1A) for the purpose of wiring the microphone to assure that microphone cords and other wiring do not interfere with the proper operation of any music or recording components.

FIG. 5 is a transverse section of this invention depicting an alternate embodiment in which the base member 2 comprises a tube 13. This tubular base member 13 has rivet slots 6 which permit the microphone boom holder base to clear the rivets of the A-frame bracket as shown more clearly in FIG. 1A. In the embodiment depicted in FIG. 5, the upper rod 5 is preferably an integral part of the base shoulder 3, which in turn is integral to the tubular base member 13. This embodiment has a larger central aperture permitting the passage of more or larger wires or cords.

The microphone boom holder assembly 1 of the present invention has a metal base assembly, preferably formed from aluminum. The mechanical stress imposed on the holder, when at an angle such as that of an A-frame assembly, combined with the weight of a microphone or other heavy component is greater than the stress for which most holders are designed. While this invention is, in the best mode, to be used in an A-frame music or recording assembly stand, it may also be used in vertical music stands.

The types of stands for which this microphone boom holder maybe used included mixer stands, music stands for sheet music, light stands, public announcement recording equipment and stereos, amplifier stands, video cassette recorder camera stands, computer stands, percussion/drum stands, signal processor stands, midi-equipment, tuning equipment stands, wireless equipment stands and the like. The microphone boom holder of this invention maybe made of metal, ABS plastic, fiber reinforced plastic, or other suitable rigid strong material specifically designed to bear the weight of a microphone or other such component to which it may be attached.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. A microphone boom holder assembly for securely retaining a relatively long microphone boom in a variety of preselected positions required by the user, said assembly comprising in operative combination:
    (a) a holder assembly having an upper and lower portion, said upper portion having means for retainingly engaging a base member of a microphone boom arm;
    (b) said holder assembly lower portion having means for engaging a hollow tubular support member assembly for a musical instrument, said hollow tubular support including at least one bracket secured thereto by fastener means extending into the hollow interior of said tubular support;
    (c) said holder assembly lower portion being securable in at least one fixed orientation by engagement with said fastener means of said tubular support;
    (d) said holder assembly lower portion has:
        (i) a longitudinal axis and an external surface spaced from said axis;
        (ii) a geometric shape in cross-section which generally corresponds to the internal cross-sectional shape of said tubular support member assembly;
        (iii) at least one groove extending parallel to said longitudinal axis disposed in said external surface therein said engagement with said fastener extending into the hollow interior of said tubular support; and
        (iv) a central aperture parallel to said longitudinal axis extending the entire length of said holder assembly lower portion through which wires may pass for electrically connecting a microphone;
    (e) said holder assembly upper portion including means to adjustably retain said boom arm base member in a preselected desired angular position; and
    (f) said tubular support engaging means of said lower portion being adapted to be received in at least one end of said tubular support so that said tubular support engaging means is substantially prevented from rotation relative to said tubular support by said engagement with said fastener means;
    (g) said holder assembly lower portion includes means for preventing said holder assembly from sliding through the entire length of said hollow tubular support;
    (h) said slide preventing means includes a shoulder member disposed adjacent one, upper end of said holder assembly lower portion comprising:
        (i) extending said shoulder member laterally outwardly beyond the external surface of said lower portion to engage one end of said hollow tubular support; or
        (ii) limiting the extent of said fastener-engaging grooves along said external surface of said holder member lower portion to provide said shoulders at one end thereof;
    (i) said laterally extending shoulder member is a washer;
    (j) said holder assembly upper portion further comprises a tubular member having an upper threaded portion; and
    (k) said tubular member includes means for retaining said washer in engagement with said one end of said holder assembly lower portion:
        (i) said holder assembly upper portion comprises a tubular member having a lower threaded portion; and
        (ii) said means for retaining said washer comprises a nut engaging said lower threaded portion.

2. A microphone boom holder assembly as in claim 1 wherein said boom arm base member engaging means of said holder assembly upper portion further comprises:
    (a) a tubular member having an upper threaded portion and a lower threaded portion;
    (b) said upper threaded portion being adapted to engage said boom arm base member; and
    (c) said lower threaded portion being adapted to engage said holder assembly lower portion.

3. A microphone boom holder assembly as in claim 2, wherein said tubular member upper threaded portion includes:

(a) a positioning nut engaging said upper threaded portion.

4. A microphone boom holder assembly for securely retaining a relatively long microphone boom in a variety of preselected positions required by the user, said assembly comprising in operative combination:

(a) a holder assembly portion, said upper portion having means for retainingly engaging a base member of a microphone boom arm;

(b) said holder assembly lower portion having means for engaging a hollow tubular support member assembly for a musical instrument, said hollow tubular support including at least one bracket secured thereto by fastener means extending into the hollow enterior of said tubular support;

(c) securable in at least one fixed orientation by engagement with said fastener means of said tubular support;

(d) said holder assembly lower portion has:

(i) a longitudinal axis and an external surface spaced form said axis;

(ii) a geometric shape in cross-section which generally corresponds to the internal cross-sectional shape of said tubular support member assembly;

(iii) at least one grove extending parallel to said longitudinal axis disposed in said external surface therein said engagement with said fastener extending into the hollow interior of said tubular support; and (iv) a central aperture parallel to said longitudinal axis extending the entire length of said holder assembly lower portion through which wires may pass for electrically connecting a microphone;

(e) said holder assembly upper portion including means to adjustably retain said boom arm base member in a preselected desired angular position; and (f) said tubular support engaging means of said lower portion being adapted to be received in at least one end of said tubular support so that said tubular support engaging means is substantially prevented from rotation relative to said tubular support by said engagement with said fastener means;

(g) said holder assembly lower portion includes means for preventing said holder assembly from sliding through the entire length of said hollow tubular support;

(h) said slide preventing means includes a shoulder member disposed adjacent one, upper end of said holder assembly lower portion comprising:

(i) extending said shoulder member laterally outwardly beyond the external surface of said lower portion to engage one end of said hollow tubular support; or (ii) limiting the extent of said fastener-engaging grooves along said external surface of said holder member lower portion to provide said shoulders at one end thereof;

(i) said laterally extending shoulder member is a washer;

(j) said holder assembly upper portion further comprises a tubular member having an upper threaded portion; and (k) said tubular member includes means for retaining said washer in engagement with said one end of said holder assembly lower portion, said means for retaining said washer comprises a roll-type pin passing through said tubular holder assembly upper portion.

5. A microphone boom holder assembly as in claim 4 wherein said boom arm base member engaging means of said holder assembly upper portion further comprises:

(a) a tubular member having an upper threaded portion and a lower unthreaded portion;

(b) said upper threaded portion being adapted to engage said boom arm base member;

(c) said lower unthreaded portion being adapted to engage said holder assembly lower portion; and (d) said holder member lower portion includes a set screw disposed to engage said lower, unthreaded portion of said holder assembly upper portion tubular member.

* * * * *